(12) United States Patent
Jiang et al.

(10) Patent No.: US 11,899,890 B2
(45) Date of Patent: Feb. 13, 2024

(54) DISPLAY DEVICE

(71) Applicant: Shenzhen China Star Optoelectronics Semiconductor Display Technology Co., Ltd., Guangdong (CN)

(72) Inventors: Miao Jiang, Guangdong (CN); Lixuan Chen, Guangdong (CN); Xin Zhang, Guangdong (CN); Lei Wen, Guangdong (CN); Bao Zha, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 556 days.

(21) Appl. No.: 17/051,273

(22) PCT Filed: May 15, 2020

(86) PCT No.: PCT/CN2020/090538
§ 371 (c)(1),
(2) Date: Oct. 28, 2020

(87) PCT Pub. No.: WO2021/217737
PCT Pub. Date: Nov. 4, 2021

(65) Prior Publication Data
US 2023/0138472 A1    May 4, 2023

(30) Foreign Application Priority Data

Apr. 29, 2020 (CN) .......................... 202010358989.9

(51) Int. Cl.
*G06F 3/044* (2006.01)
*G06F 3/0354* (2013.01)
(Continued)

(52) U.S. Cl.
CPC ........ *G06F 3/0446* (2019.05); *G06F 3/03542* (2013.01); *G06F 3/0412* (2013.01); *G06F 3/0421* (2013.01)

(58) Field of Classification Search
CPC ...... G06F 3/041–047; G06F 2203/041–04114; G06F 3/0412;
(Continued)

(56) References Cited

U.S. PATENT DOCUMENTS 8,810,736 B1    8/2014   Fan
2011/0272689 A1*  11/2011  Park .................... G02F 1/13338
                                                            438/57
(Continued)

FOREIGN PATENT DOCUMENTS

CN    101359111    2/2009
CN    102999227    3/2013

*Primary Examiner* — Sanjiv D. Patel

(57) ABSTRACT

A display device including a beam emitter and a display panel is provided. The beam emitter emits a first beam; the display panel includes a display screen body and a light control layer. The light control layer includes photosensitive devices that outputs a sensing signal according to a sensing result, a control module for controlling turning on and turning off of the photosensitive devices, and a reading module for reading the sensing signal output by the photosensitive devices and determining a projection position of the first beam on the display panel according to the sensing signal.

18 Claims, 10 Drawing Sheets

(51) Int. Cl.
*G06F 3/041* (2006.01)
*G06F 3/042* (2006.01)

(58) Field of Classification Search
CPC ......... G06F 3/0386; G06F 3/042–0421; G06F 3/03542; G06F 3/0443; H01K 59/40; H01K 59/126; H01L 29/78633
See application file for complete search history.

(56) References Cited

U.S. PATENT DOCUMENTS

| | | |
|---|---|---|
| 2013/0033455 A1 | 2/2013 | Jeong et al. |
| 2013/0063398 A1 | 3/2013 | Ko et al. |
| 2017/0277356 A1 | 9/2017 | Hsieh |
| 2017/0315589 A1* | 11/2017 | Isa .................. G06F 1/1675 |
| 2018/0210561 A1* | 7/2018 | Shigemori ............. G09B 21/00 |
| 2022/0075461 A1* | 3/2022 | Yamazaki .............. H10K 59/12 |

* cited by examiner

DISPLAY DEVICE

RELATED APPLICATIONS

This application is a National Phase of PCT Patent Application No. PCT/CN2020/090538 having International filing date of May 15, 2020, which claims the benefit of priority of Chinese Patent Application No. 202010358989.9 filed on Apr. 29, 2020. The contents of the above applications are all incorporated by reference as if fully set forth herein in their entirety.

FIELD AND BACKGROUND OF THE INVENTION

The present disclosure relates to the field of display technology, and more particularly, to a display device.

With development of the times, display panels have become more and more widely used. Most operations on the display panels are done via direct contact or remote control when users use the display panels as TV display devices remotely.

For example, the users need to walk to a front of the display panels to directly touch the display panels when operating by direct contact, which is very inconvenient. Meanwhile, operating by remote control is mainly achieved through pressing remotely control buttons, wherein when making selections in a complex interface, it is often necessary to perform multiple operations through the remote control to move a cursor to a corresponding icon, which is also very inconvenient.

In the current display devices, when the users use the display panels as TV display devices from a long distance, operations are very inconvenient.

SUMMARY OF THE INVENTION

The present disclosure provides a display device including a beam emitter and a display panel;

the beam emitter is configured to emit a first beam for marking an input position on the display panel, and perform an operation to the input position which marked by the first beam;

the display panel comprises a display screen body and a light control layer disposed on a light-emitting side of the display screen body, the light control layer comprises a photosensitive device configured to sense the first beam projected on the display panel, the photosensitive device is configured to output a sensing signal according to a sensing result;

wherein the light control layer further comprises a control module and a reading module, the control module is electrically connected to the photosensitive device to output a control signal which controlling turning on and turning off of the photosensitive device; the reading module and the photosensitive device is electrically connected to read the sensing signal output by the photosensitive device, the reading module configured to determine a projection position of the first beam on the display panel according to the sensing signal, and the reading module is further configured to perform corresponding operation to the projection position of the first beam.

In some embodiments, the light control layer includes:
a first gate electrode;
a gate insulating layer covering the first gate electrode;
a first semiconductor layer disposed on the gate insulating layer;
a first source-drain electrodes electrically connected to the first semiconductor layer; and
a first passivation layer covering the first source-drain electrodes and the first semiconductor layer;
wherein the photosensitive devices comprise the first gate electrode, the first semiconductor layer, and the first source-drain electrodes, and the reading module is electrically connected to the first source-drain electrodes.

In some embodiments, the first gate electrode is disposed on a surface of the display screen body.

In some embodiments, the light control layer further comprises a base substrate disposed on the display screen body, and the first gate electrode is disposed on a side of the base substrate away from the display screen body.

In some embodiments, the light control layer further comprises switching devices electrically connected to the photosensitive devices, one of the switching device includes:
a second gate electrode, wherein the second gate electrode and the first gate electrode are arranged in a same layer and spaced apart, and the control module is electrically connected to the second gate electrode;
a second semiconductor layer, wherein the second semiconductor layer and the first semiconductor layer are disposed in a same layer and spaced apart; and
a second source-drain electrodes, wherein the second source-drain electrodes is disposed in a same layer as the first source-drain electrodes and electrically connected to the second semiconductor layer, wherein the second source-drain electrodes are electrically connected to the first source-drain electrodes.

In some embodiments, a light-shielding layer is further disposed on the first passivation layer, and an orthographic projection of the light-shielding layer on the gate insulating layer covers an orthographic projection of the second semiconductor layer on the gate insulating layer.

In some embodiments, the display panel further comprises a touch device disposed on the light-emitting side of the display screen body, the touch device comprises an transmitting electrode and a receiving electrode spaced apart from each other, a touch capacitance is formed between the transmitting electrode and the receiving electrode, and a photosensitivity of the photosensitive device is less than a first presetting value.

In some embodiments, the transmitting electrode is disposed in a same layer as the first gate electrode, and the receiving electrode is disposed in a same layer as the first source-drain electrode.

In some embodiments, the transmitting electrode and the receiving electrode are disposed in a same layer.

In some embodiments, a side of the first passivation layer away from the display screen body is provided with a planarization layer, and the transmitting electrode and the receiving electrode are disposed on the planarization layer, and a second passivation layer covering the transmitting electrode and the receiving electrode is also disposed on the planarization layer.

In some embodiments, the transmitting electrode and the receiving electrode are disposed on a surface of the display screen body, the surface of the display screen body is provided with a second passivation layer covering the transmitting electrode and the receiving electrode, and the light control layer is disposed on a side of the second passivation layer away from the display screen body.

In some embodiments, the transmitting electrode and the receiving electrode are disposed in a same layer as the first gate electrode, or the transmitting electrode and the receiving electrode are arranged in a same layer as the first source-drain electrode.

In some embodiments, the photosensitive devices are as multipurpose as a touch device, and a photosensitivity of the photosensitive devices are greater than a second presetting value.

In some embodiments, the beam emitter includes:

a main body;

a light-emitting component disposed on the main body and configured to emit the first beam;

a projection button and an operation button both disposed on the main body; and a control component disposed on the main body, wherein the control component is connected with the projection button, the operation button, and the light-emitting component, configured to control the light-emitting component to emit the first beam when the projection button is pressed and configured to control the reading module to perform the corresponding operation to the projection position of the first beam when the operation button is pressed.

In some embodiments, the beam emitter further emits a second beam to confirm the input position, and the beam emitter emits the second beam when the operation button is pressed, the photosensitive devices output a first sensing signal to the reading module when sensing the first beam, the photosensitive devices output a second sensing signal to the reading module when sensing the second beam, and the reading module compares the first sensing signal and the second sensing signal and performs a corresponding operation to the projection position of the second beam according to a comparison result, or the reading module performs the corresponding operation to a projection position of first beam according to the second sensing signal.

In some embodiments, a first light spot projected on the display panel by the first beam and a second light spot projected on the display panel by the second beam are located at any position on a surface of the display panel, and the first light spot and the second light spot both cover at least one orthographic projection of the photosensitive device on the surface of the display panel.

In some embodiments, the beam emitter is communicatively connected with the display panel, the beam emitter sends the control signal to the reading module when the operation button is pressed, and the reading module performs the corresponding operation to the projection position of the first beam according to the control signal.

In some embodiments, the first beam is different from the second beam.

In some embodiments, the first beam is different from the second beam in one or more of intensity, wavelength, beam cross-sectional size, and frequency.

In some embodiments, all of the photosensitive devices are distributed in an array, the light control layer further comprises a plurality of first signal lines arranged along a lateral direction and a plurality of second signal lines arranged along a longitudinal direction, the plurality of first signal lines are distributed at intervals in the longitudinal direction, the plurality of second signal lines are distributed at intervals in the lateral direction, each one of the plurality of first signal lines corresponds to and electrically connects to one row of the photosensitive devices, each one of the plurality of second signal lines corresponds to and electrically connects to one column of the photosensitive devices, all of the first signal lines are electrically connected to the control module to transmit the control signal to the photosensitive devices, and all of the second signal lines are electrically connected to the reading module to read the sensing signal output by the photosensitive devices.

By simultaneously integrating the light control function and the touch function in the display panel, the display panel has both the light control function and the touch function. At the same time, the display panel can be used with the beam emitter when it needs to be operated remotely, so that the presenter can operate the display panel by holding and using the beam emitter, and meanwhile quickly realize an input position conversion by moving the beam emitter, which is convenient and fast for remote operation of the display panel.

BRIEF DESCRIPTION OF THE SEVERAL VIEWS OF THE DRAWINGS

The technical solutions and other beneficial effects of the present disclosure will be apparent through the detailed description of the specific implementation of the present disclosure in conjunction with the accompanying figures.

DESCRIPTION OF SPECIFIC EMBODIMENTS OF THE INVENTION

In order to make the purpose, technical solutions and effects of the present disclosure clearer, the present disclosure will be described in further detail below with reference to the accompanying figures and embodiments. It should be understood that the specific embodiments described herein are only used to explain the present disclosure, and are not used to limit the present disclosure.

The present disclosure is directed to the technical problem of inconvenient operation when a user uses a display panel as a television display device from a long distance in the currently display device. This present disclosure can solve the above problems.

Embodiment 1

Figure 1:
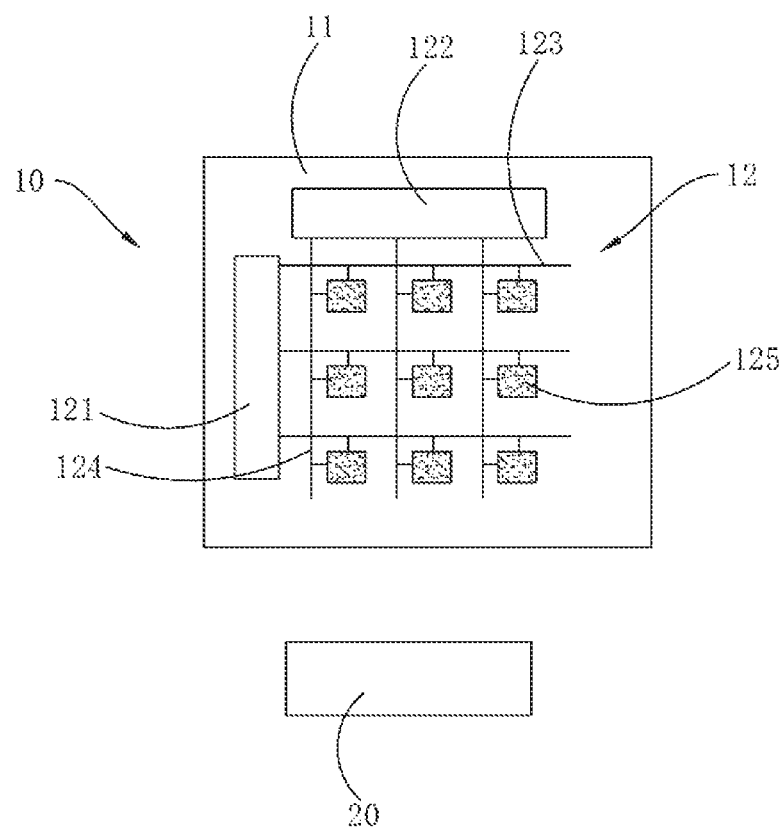
FIG. 1 is a schematic structural diagram of a display device of one embodiment of the present disclosure.

A display device, as shown in FIG. 1, the display device includes a beam emitter 20 and a display panel 10.

Specifically, the beam emitter 20 is configured to emit a first beam for marking an input position on the display panel 10, and perform an operation to the input position which marked by the first beam.

It should be noted that the first beam is a positioning beam, which is provided to position a point which needs to be controlled by light on the display panel 10. That is, to mark an input position on the display panel 10, the first beam is a visible light, so that human eyes can see where the first beam is projected on the display panel 10.

Specifically, the display panel 10 includes a display screen body 11 and a light control layer 12 disposed on a light-emitting side of the display screen body 11. The light control layer 12 includes photosensitive devices 125 configured to sense the first beam projected on the display panel 10, and the photosensitive devices 125 are configured to output a sensing signal according to a sensing result.

It should be noted that the photosensitive devices 125 may be various types of photosensitive devices 125, such as a photodiode, a photosensitive complementary metal oxide semiconductor (CMOS), or a photoconductive thin film transistor (TFT), etc.

It should be noted that the photosensitive devices 125 are distributed at a display area of the display screen body 11. The plurality of photosensitive devices 125 may also be provided in the frame area of the display screen body 11 when the display screen body 11 has a frame area and the frame area can be used for display.

Specifically, the light control layer 12 further includes a control module 121 and a reading module 122. The control module 121 is electrically connected to the photosensitive device 125 to output a control signal which controls turning on and turning off of the photosensitive device 125. The reading module 122 is electrically connected to the photosensitive device 125 to read the sensing signal of the photosensitive device 125. The reading module 122 is configured to read the sensing signal output by the photosensitive device 125, is configured to determine a projection position of the first beam on the display panel 10 according to the sensing signal, and is further configured to perform corresponding operation to the projection position of the first beam.

It should be noted that when the display panel 10 needs to be operated remotely, for example, when displaying through the display panel 10 in a conference room, the presenter hand holds the beam emitter 20, wherein the beam emitter 20 is configured to emit a first beam for marking an input position which will be operated on the display panel 10, and then performs an operation to the input position which is marked by the first beam emitted by the beam emitter 20. The reading module 122 is further configured to perform corresponding operation to the projection position of the first beam, for example, determining operations, handwriting operations, dragging light spots, etc., thereby the remote operation of the display panel 10 can be achieved. At the same time, moving the beam emitter 20 can quickly achieve a change of the input position, making the remote operation of the display panel 10 convenient and fast.

In one embodiment, the plurality of photosensitive devices 125 may be distributed in an array, and the light control layer 12 further includes a plurality of first signal lines 123 arranged along a lateral direction and a plurality of second signal lines 124 arranged along a longitudinal direction, wherein the plurality of first signal lines 123 are spaced by intervals in the longitudinal direction, and the plurality of second signal lines 124 are spaced by intervals in the lateral direction, wherein one first signal line 123 corresponds to and electrically connects to one row of the photosensitive devices 125, and one second signal line 124 corresponds to and electrically connects to one column of the photosensitive devices 125. All of the first signal lines 123 are electrically connected to the control module 121 for transmitting a control signal to the photosensitive devices 125, and all of the second signal lines 124 are electrically connected to the reading module 122 for reading the sensing signal output by the photosensitive device 125.

Figure 2:
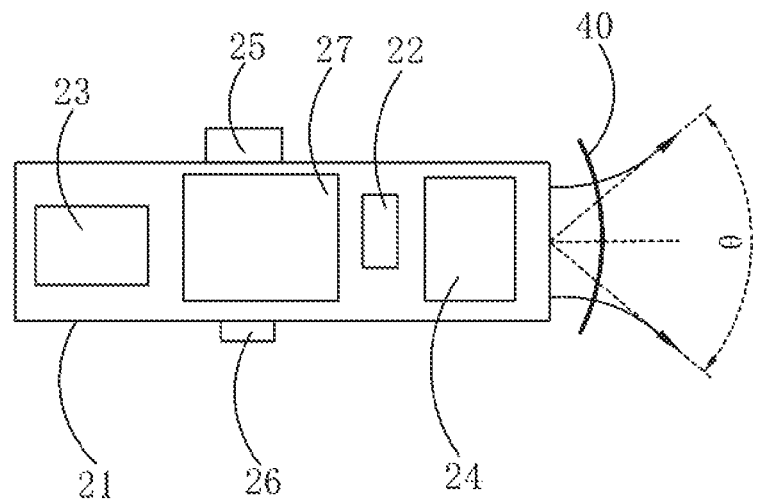
FIG. 2 is a schematic structural diagram of a beam emitter of one embodiment of the present disclosure.

In one embodiment, as shown in FIGS. 1 and 2, the beam emitter 20 includes a main body 21, wherein a light-emitting component, a projection button 25, an operation button 26, and a control component 27 are disposed on the main body 21.

Specifically, the light-emitting component is configured to emit the first beam and a second beam, and the light-emitting component includes a light source 22, a power source 23 connected to the light source 22, and an optical component 24 disposed on the light-emitting side of the light source 22. The beam emitted by the light source 22 is adjusted by the optical component 24 and projected onto the display panel 10.

Specifically, the control component 27 is connected to the projection button 25, the operation button 26, and the light-emitting component. The control component 27 is configured to control the light-emitting component to emit the first beam when the projection button 25 is pressed, and control the reading module 122 to perform a corresponding operation on the projection position of the first beam when the operation button 26 is pressed.

It should be noted that when it is required to operate to the display panel 10, pressing the projection button 25 will allow the light-emitting component of the beam emitter 20 to emit the first beam. After the first beam is projected on the display panel 10 at the position to be operated, pressing the operation button 26 will allow the reading module 122 to perform a corresponding operation on the projection position of the first beam. By pressing the projection button 25 and the operation button 26, the beam emitter 20 realizes a function similar to a mouse, and does not require a plane like a mouse, and therefore can be operated simply and conveniently.

It should be noted that for ease of operation, the light source 22 may be kept turned on after pressing the projection button 25, that is, the light source 22 keeps emitting beams, and after pressing the projection button 25 again, the light source 22 is turned off.

It should be noted that the main body 21 has an accommodating cavity. The light-emitting component and the control component 27 may be disposed in the accommodating cavity, and a portion of the projection button 25 and a portion of the operation button 26 extend into the accommodating cavity to connect with the control component 27. The projection button 25 and the operation button 26 may be located on the same side of the main body 21, and the projection button 25 and the operation button 26 may also be located on both sides of the main body 21, respectively.

Specifically, a specific operation mode can be adopted to the beam emitter 20 for achieving more functions, for example, rotating the beam emitter 20 clockwise or/and counterclockwise for the operation such as handwriting, closing the display panel 10, opening the setting file, or selecting large-scale range; pressing the operation button 26 and then rotating the beam emitter 20 clockwise or/and counterclockwise for the operation such as handwriting, closing the display panel 10, opening the setting file, or selecting large-scale range; pressing the button 26 and then sliding the beam emitter 20 for the operation such as handwriting, closing the display panel 10, opening the setting file, or selecting large-scale range.

In one embodiment, the beam emitter 20 further emits a second beam to confirm the input position on the display panel, and the beam emitter 20 emits the second beam when the operation button 26 is pressed; the photosensitive devices 125 output a first sensing signal to the reading module 122 when sensing the first beam, the photosensitive devices 125 output a second sensing signal to the reading module 122 when sensing the second beam, and the reading module 122 compares the first sensing signal and the second sensing signal, and performs a corresponding operation to the projection position of the second beam according to a comparison result, or the reading module 122 performs a corresponding operation to the projection position of the first beam according to the second sensing signal.

It should be noted that the second beam is a trigger beam for performing a light control operation on the display panel 10, and the second beam may be visible light or invisible light.

It should be noted that the first beam and the second beam may be laser light or a beam formed by concentrating scattered light. The first beam and the second beam may be red beams to facilitate human eyes to see the position of the beam projected on the display panel 10, and the first beam and the second beam may also be white, yellow or other color beams.

It should be noted that the first beam and the second beam are different, so that when the first beam is projected on the display panel 10, the light control operation will not occur on the display panel 10, and after the second beam is projected on the display panel 10, the display panel 10 then performs a corresponding light control operation; the first beam differs from the second beam in one or more of intensity, wavelength, cross-sectional size of beam, and frequency.

In another embodiment, the beam emitter 20 is communicatively connected with the display panel 10, and when the operation button 26 is pressed, the beam emitter 20 sends a control signal to the reading module 122, and the reading module 122 performs corresponding operations on the projection position of the first beam according to the control signal.

It should be noted that the beam emitter 20 and the display panel 10 can be connected to each other via a wireless direction such as Bluetooth, infrared, or wireless network, and the beam emitter 20 and the display panel 10 can also be connected by wire connection such as connected by a data transmission line to achieve communicative connection.

When the beam emitter 20 communicatively connects with the display panel 10, the beam emitter 20 further includes a gyroscope. During fast movement of the beam emitter 20, acceleration and angular acceleration information of the gyroscope is used to correct the position coordinates of the first beam projected on the display panel 10 to make the operation more accurate and reduce delay control.

Figure 3:
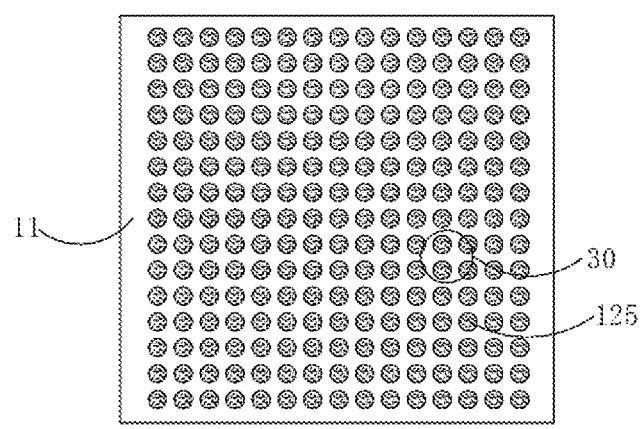
FIG. 3 is a schematic diagram of a first light spot on a display panel of one embodiment of the present disclosure.

Specifically, as shown in FIG. 2 and FIG. 3, a first light spot 30 covers at least one orthographic projection of the photosensitive devices 125 on the surface of the display panel 10 when the first light spot 30 projected on the display panel 10 by the first beam is located at any position on the surface of the display panel 10.

In one embodiment of the present disclosure, the beam emitter 20 also emits the second beam. When a second light spot projected by the second beam on the display panel 10 is located at any position on the surface of the display panel 10, the second light spot covers an orthographic projection of the photosensitive devices 125 on the surface of the display panel 10.

It should be noted that by designing the distributed density of the plurality of photosensitive device 125, the distributed density of the plurality of photosensitive devices 125 are matched with the sizes of the first light spot 30 and the second light spot, so that when the first light spot 30 and the second light spot are located on the display panel 10 at any position, they can cover the photosensitive devices 125, so that any position of the display panel 10 can be operated by the beam emitter 20.

It should be noted that the overall shapes of the first light spot 30 and the second light spot may be circular, square, or trapezoidal; the diameter of the first light spot 30 and the second light spot is greater than 5 mm when the shapes of the first light spot 30 and the second light spot are circular.

In one embodiment, the reading module 122 can read and filter the plurality of sensing signals output from the photosensitive devices 125 to determine the position of the photosensitive devices 125 which is located at a central area of the first light spot 30, and performs an operation on the position corresponding to the central area of the first light spot 30 on the display panel 10 to prevent misoperation from occurring when the first light spot 30 and the second light spot are located at any position of the display panel 10 and cover a plurality of photosensitive devices 125.

In one embodiment, a diffuser lens 40 is disposed on a light-emitting side of the beam emitter 20, and the diffuser lens 40 is configured to increase the scattering angle $\theta$ of the light emitted from the beam emitter 20.

It should be noted that taking the Gaussian laser emitted by the beam emitter 20 as an example, the diffuser lens 40 increases the scattering angle $\theta$ of the Gaussian laser, so that a light spot with a greater diameter can be formed at a suitable distance, and the required laser density of the display panel 10 can be reduced while not significantly increasing the diameter of the beam emitted by the beam emitter 20.

Figure 4:
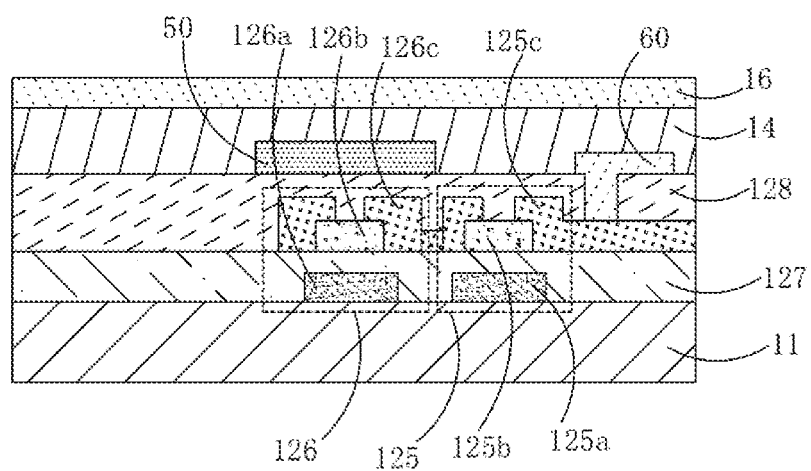
FIG. 4 is a schematic structural diagram of a first structure of a display panel of embodiment 1 of the present disclosure.

As shown in FIG. 4, the light control layer 12 includes a first gate electrode 125*a*, a gate insulating layer 127 covering the first gate electrode 125*a*, a first semiconductor layer 125*b* disposed on the gate insulating layer 127, a first source-drain electrode 125*c* electrically connected to the first semiconductor layer 125*b*, and a first passivation layer 128 covering the first source-drain electrode 125*c* and the first semiconductor layer 125*b*.

In one embodiment of the present disclosure, the photosensitive devices 125 include the first gate electrode 125*a*, the first semiconductor layer 125*b*, and the first source-drain electrode 125*c*, wherein the reading module 122 is electrically connected to the first source-drain electrode 125*c*.

It should be noted that the first semiconductor layer 125*b* is made of a photosensitive semiconductor material, and a resistance of the first semiconductor layer 125*b* changes when the beam emitted by the beam emitter 20 is irradiated on the photosensitive devices 125, thereby producing a readout sensing signal read by the reading module 122.

It should be noted that the first semiconductor layer 125*b* may be formed of a hydrogenated amorphous silicon.

Specifically, the light control layer 12 further includes a switching device 126 electrically connected to the photosensitive devices 125, and the switching device 126 includes a second gate electrode 126*a*, a second semiconductor layer 126*b*, and a second source-drain electrode 126*c*.

In one embodiment of the present disclosure, the second gate electrode 126*a* and the first gate electrode 125*a* are arranged in the same layer and spaced apart, and the control module 121 is electrically connected to the second gate electrode 126a. The second semiconductor layer 126b and the first semiconductor layer 125b are disposed in the same layer and spaced apart. The second source-drain electrode 126c is disposed in the same layer as the first source-drain electrode 125c and is electrically connected to the second semiconductor layer 126b, and the second source-drain electrode 126c is electrically connected to the first source-drain electrode 125c to control the turning on and turning off of the photosensitive devices 125.

It should be noted that the control module 121 inputs a control signal to the second gate electrode 126a to control the turning on and turning off of the switching device 126, thereby controlling the turning on and turning off of the photosensitive devices 125.

It should be noted that the first gate electrode 125a and the second gate electrode 126a can be made from the same material and be formed by the same process; the first semiconductor layer 125b and the second semiconductor layer 126b can use the same material and be formed by the same process; and the first source-drain electrode 125c and the second source-drain electrode 126c can use the same material and be formed through the same process, thereby reducing the number of processes and the production cost.

In one embodiment of the present disclosure, a light-shielding layer 50 is further disposed on the first passivation layer 128, and an orthographic projection of the light-shielding layer 50 on the gate insulating layer 127 covers an orthographic projection of the second semiconductor layer 126b on the gate insulating layer 127 to prevent the beam emitted by the beam emitter 20 from affecting the normal use of the switching device 126.

In one embodiment, a conductive metal layer 60 is further disposed on the first passivation layer 128, and the conductive metal layer 60 is in contact with the first source-drain electrode 125c through via holes, and the first source-drain electrode 125c may be electrically connected to the reading module 122 through the conductive metal layer 60.

Specifically, the display panel 10 further includes an encapsulation layer 16 disposed on a side of the light control layer 12 away from the display screen body 11, the encapsulation layer 16 may be an encapsulation cover plate or a film encapsulation layer, wherein the encapsulation cover plate may be a plastic cover plate or a glass cover plate, and the thin film encapsulation layer may be formed by alternately laminating organic layers and inorganic layers.

It should be noted that when the encapsulation layer 16 is an encapsulation cover plate, the encapsulation layer 16 is installed and fixed above the light control layer 12 through a first optical adhesive layer 14.

In a first embodiment, the first gate electrode 125a is disposed on a surface of the display screen body 11, that is, the light control layer 12 is directly integrated on the display screen body 11 to decrease an overall thickness of the display panel 10.

Figure 5:
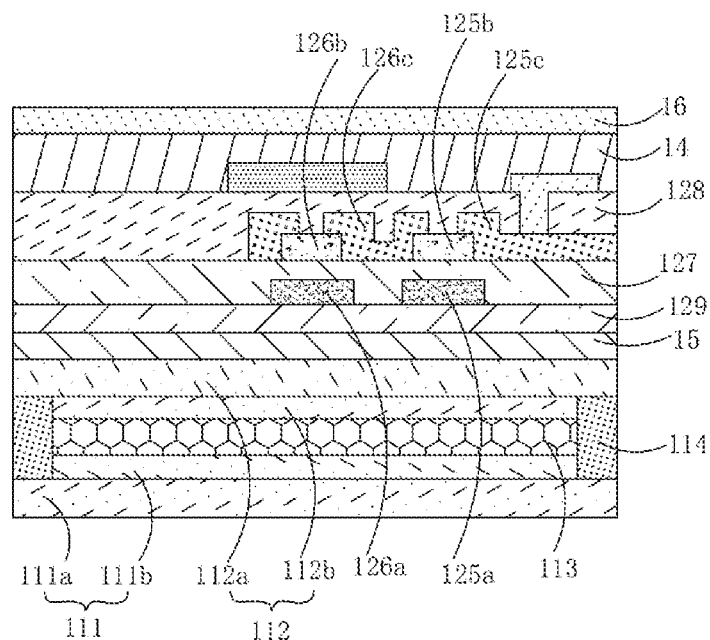
FIG. 5 is a schematic structural diagram of a second structure of the display panel of embodiment 1 of the present disclosure.

In a second embodiment, as shown in FIG. 5, the light control layer 12 further includes a base substrate 129 disposed on the display screen body 11, and the first gate electrode 125a is disposed on a side away from the display screen body 11 of the base substrate 129, that is, the light control layer 12 is attached to the display screen body 11 in a hanging manner. Therefore, the display screen body 11 and the light control layer 12 can be manufactured separately, and the light control layer 12 can be installed on the display screen body 11 to facilitate the production of the display panel 10.

In one embodiment of the present disclosure, the light control layer 12 is installed and fixed on the display screen body 11 through a second optical adhesive layer 15 on when the light control layer 12 is attached to the display screen body 11 in the hanging manner.

In the first embodiment and the second embodiment, the first optical adhesive layer 14 is disposed on the first passivation layer 128 and covers the light-shielding layer 50, and the encapsulation layer 16 is installed and fixed on the light control layer 12 by the first optical adhesive layer 14 when the encapsulation layer 16 is an encapsulation cover plate.

Specifically, the display screen body 11 may be a liquid crystal display (LCD) screen body, an organic light-emitting diode (OLED) display body, a light-emitting diode (LED) display screen body, or a laser display body, etc.

As shown in FIG. 5, taking an LCD screen body as the display screen body 11 as an example, the display screen body 11 includes a color film substrate 112 and an array substrate 111 oppositely disposed, and a sealant layer 114 is disposed between the color film substrate 112 and the array substrate 111. A cavity is formed between the sealant layer 114, the color filter substrate 112, and the array substrate 111, and a liquid crystal layer 113 is disposed in the cavity.

In one embodiment, the array substrate 111 includes a first substrate 111a and an array layer 111b disposed on a side of the first substrate 111a close to the color filter substrate 112, and the color filter substrate 112 includes a second substrate 112a, and a color filter layer 112b disposed on a side close to the array substrate 111 of the second substrate 112a.

In one embodiment, the light control layer 12 may be disposed on a side away from the array substrate 111 of the color filter substrate 112, and an optical element such as a polarizer may be disposed between the light control layer 12 and the color filter substrate 112.

Embodiment 2

Figure 6:
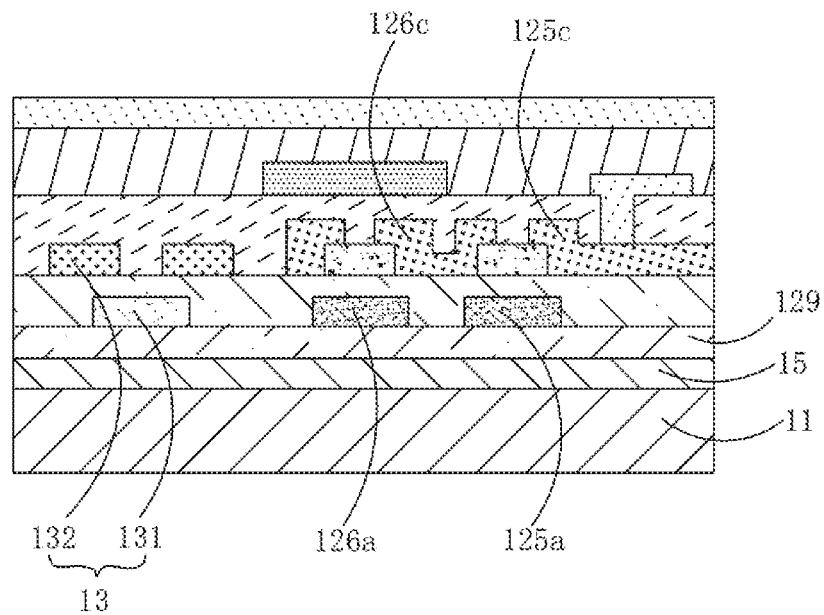
FIG. 6 is a schematic structural diagram of a display panel of embodiment 2 of the present disclosure.

A display device, as shown in FIG. 6, is different from the embodiment 1 in that the display panel 10 further includes a touch device 13 disposed on the light-emitting side of the display screen body 11. The touch device 13 includes a transmitting electrode 131 and a receiving electrode 132 spaced apart, and a touch capacitor is formed between the transmitting electrode 131 and the receiving electrode 132.

It should be noted that a touch capacitance is formed between the transmitting electrode 131 and the receiving electrode 132, and the touch capacitance is a mutual capacitance. A touch capacitance changes when a finger touches the display panel 10, and the touch device 13 sends a touch signal to the driving module of the display panel 10. The driving module determines the touch position according to the touch signal and performs corresponding operation to the touch position. Accordingly, the display panel 10 has both the light control function and the touch control function. The touch panel function can be used to quickly and conveniently operate the display panel 10 when the display panel 10 is used as a device such as a mobile phone or a tablet, thereby realizing quick and convenient operation of the display panel 10 through the light control function when the display panel 10 is used as a TV or other device.

Specifically, the transmitting electrode 131 and the first gate electrode 125a are disposed in the same layer, and the receiving electrode 132 and the first source-drain electrode 125c are disposed in the same layer, thereby integrating the touch device 13 into the light control layer 12, on the premise that the display panel 10 has both the light control capability and the touch control capability, preventing the area of the display panel 10 from increasing.

It should be noted that the transmitting electrode 131 may use the same material and be formed through the same process as the first gate electrode 125*a*, and the receiving electrode 132 may use the same material and be formed through the same process as the first source-drain electrode 125*c*, to reduce production processes and save costs.

Specifically, a plurality of transmitting electrodes 131 are distributed on the same layer at intervals, and the plurality of transmitting electrodes 131 may be distributed uniformly or discretely; the plurality of receiving electrodes 132 may be integrally formed to form a grid-like structure, the plurality of receiving electrodes 132 may be spaced apart and electrically connected by a connecting line 70 to form a grid-like structure, so that the display panel 10 has a touch function at any position.

Specifically, a photosensitivity of the photosensitive devices 125 is less than a first presetting value.

It should be noted that the greater the sensitivity of the photosensitive devices 125, the more sensitive it is to the induction of light. An intensity of the beam emitted by an ordinary-size small beam emitter 20 is about 2000 lux, and an intensity of indoor light and ambient light is about 400 lux. By designing the photosensitivity of the photosensitive devices 125, the photosensitivity of the photosensitive devices 125 is reduced, and the light control device is prevented from being induced and causing misoperation when the display panel 10 is touch-operated. The first presetting value may be selected based on the actual situation so that the photosensitive devices 125 do not induce weak light such as indoor lights and ambient light, and at the same time, the photosensitive devices 125 may sense the strong light emitted by the beam emitter 20.

As shown in FIG. 7 to FIG. 11, FIG. 7 to FIG. 11 are schematic diagrams of a manufacturing process of the display panel 10 in the embodiment 2.

Figure 7:
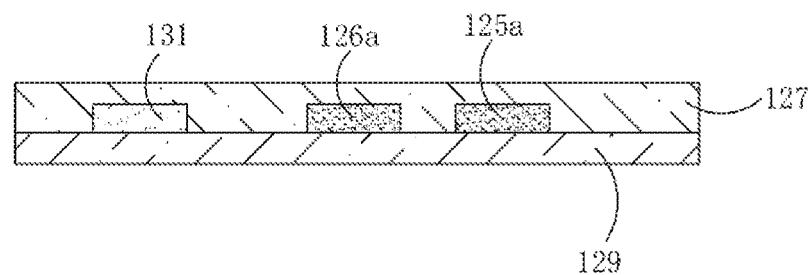
FIGS. 7, 8, 9, 10 and 11 are schematic diagrams of a manufacturing process of the display panel of embodiment 2 of the present disclosure.

As shown in FIG. 7, a first metal layer is formed on the base substrate 129, and the first metal layer is patterned to form the transmitting electrode 131, the first gate electrode 125*a*, and the second gate electrode 126*a* which are spaced apart.

Figure 8:
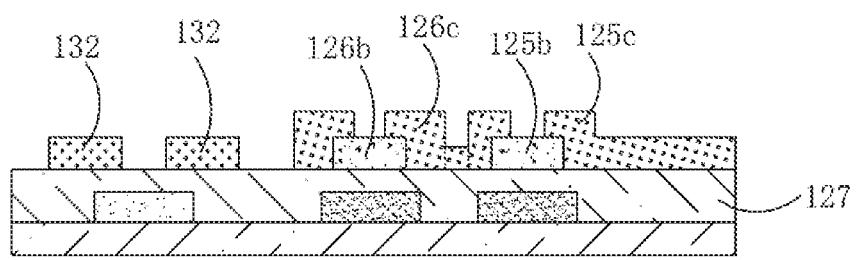

As shown in FIG. 8, a gate insulating layer 127 which covers the transmitting electrode 131, the first gate electrode 125*a* and the second gate electrode 126*a* is formed; a semiconductor layer is formed on the gate insulating layer 127, and is patterned to form a first semiconductor layer 125*b* and a second semiconductor layer 126*b*, and then a second metal layer is formed on the first semiconductor layer 125*b* and the second semiconductor layer 126*b*; a half-tone mask is used to pattern the second metal layer to form a receiving electrode 132, a first source-drain electrode 125*c* connected to the first semiconductor layer 125*b*, and a second source-drain electrode 126*c* connected to the semiconductor layer 126*b*.

Figure 9:
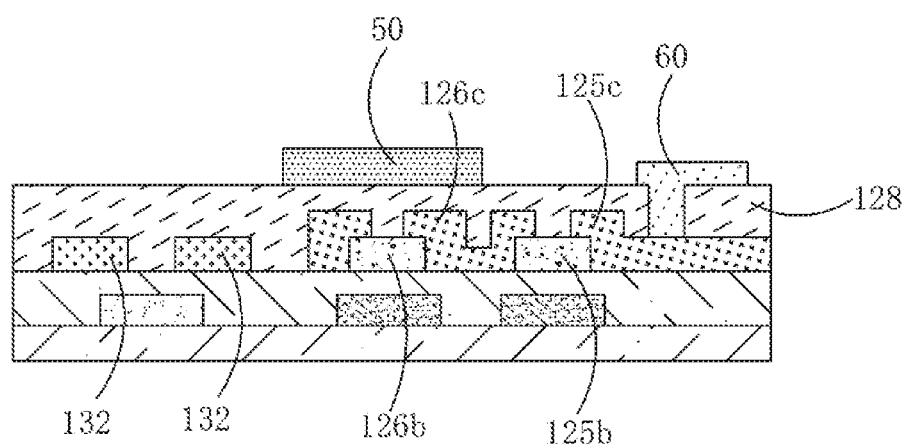

As shown in FIG. 9, a passivation layer 128 which covers the receiving electrode 132, the first semiconductor layer 125*b*, the first source-drain electrode 125*c*, the second semiconductor layer 126*b*, and the second source-drain electrode 126*c* is formed; a light-shielding layer 50 is formed on a region corresponding to the second semiconductor layer 126*b* and the first passivation layer 128; and after forming a via hole that extends to the second source-drain electrode 126*c*, a conductive metal layer 60 that fills the via hole is formed on the first passivation layer 128.

Figure 10:
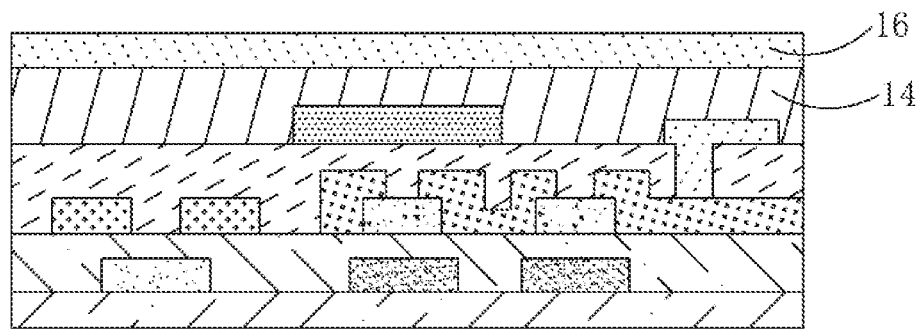

As shown in FIG. 10, a first optical adhesive layer 14 which covers the light-shielding layer 50 and the conductive metal layer 60 is formed, and an encapsulation cover plate is pasted on the first optical adhesive layer 14 to form an external function layer integrating touch function and light control function.

Figure 11:
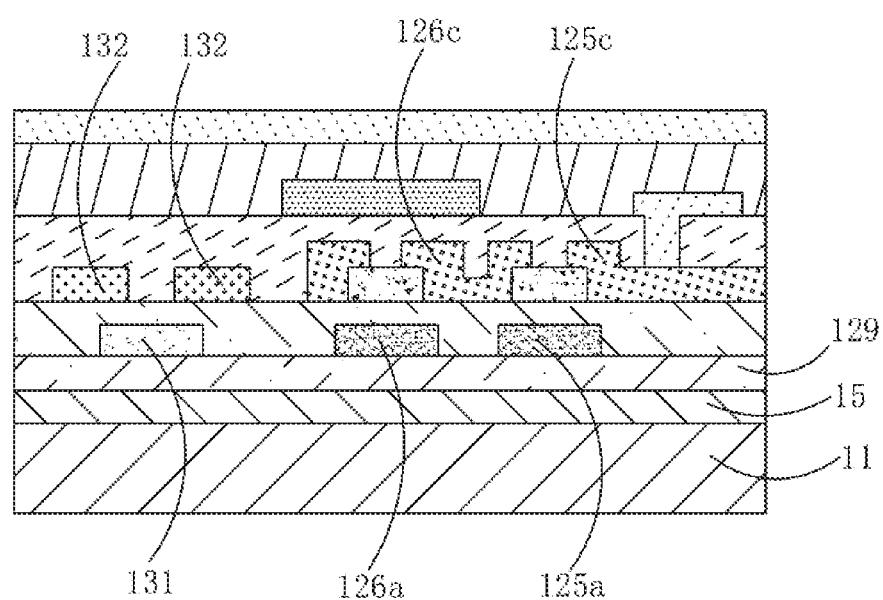

As shown in FIG. 11, a second optical adhesive layer 15 is coated on a surface of the display screen body 11, and the external functional layer is adhered and fixed on the display screen body 11 through the second optical adhesive layer 15.

Embodiment 3

Figure 12:
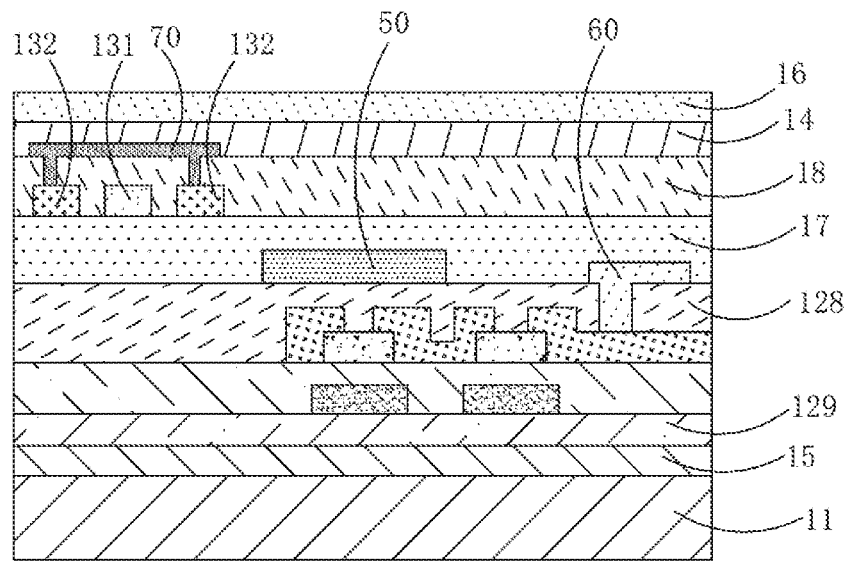
FIG. 12 is a schematic structural diagram of a display panel of embodiment 3 of the present disclosure.

A display device, as shown in FIG. 12, is different from the second embodiment in that the transmitting electrode 131 and the receiving electrode 132 are arranged in the same layer, and a planarization layer 17 is disposed on one side away from the display screen body 11 of the first passivation layer 128. The transmitting electrode 131 and the receiving electrode 132 are disposed on the planarization layer 17, and the planarization layer 17 is further provided with a second passivation layer 18 covering the transmitting electrode 131 and the receiving electrode 132.

It should be noted that, by integrating the touch device 13 above the light control layer 12, the display panel 10 can be prevented from defecting caused by the arrangement of the touch device 13 and the light control device interfering with each other, and it is also improves touch sensitivity of the display panel 10. Meanwhile, the transmitting electrode 131 and the receiving electrode 132 are arranged in the same layer, thereby reducing the overall thickness of the display panel 10. An electric field between the receiving electrode 132 and the transmitting electrode 131 at the corresponding area on the display panel 10 changes when a finger touches the display panel 10, and the light control device sends a touch signal to the driving module of the display panel 10. The driving module determines a touch position according to the touch signal and performs corresponding operations on the touch position.

Specifically, a plurality of the receiving electrodes 132 may be spaced apart from each other, wherein each two adjacent receiving electrodes 132 are electrically connected by a connecting line 70 on the second passivation layer 18 to form a mesh structure.

It should be noted that all of the receiving electrodes 132 are electrically connected by the connecting line 70 to form the mesh structure, so as to achieve the purpose that any position on the display panel 10 will have a touch function, and the connecting line 70 and the receiving electrodes 132 are disposed in different film layers, so as to prevent short circuiting between the connecting line 70 and the transmitting electrode 131.

In one embodiment, the planarization layer 17 is disposed on the first passivation layer 128 and covers the light-shielding layer 50 and the conductive metal layer 60; the first optical adhesive layer 14 is disposed on the second passivation layer 18 and covers the connecting line 70.

It should be noted that FIG. 12 only illustrates the case where the touch device 13 is disposed above the light control layer 12. In actual implementation, the transmitting electrode 131 and the receiving electrode 132 may also be provided in the same layer as the first gate electrode 125*a* or the first source-drain electrodes 125*c*, and the transmitting electrode 131 and the receiving electrode 132 may also be disposed on the base substrate 129.

As shown in FIG. 13 to FIG. 16, FIG. 13 to FIG. 16 are schematic diagrams of the manufacturing process of the display panel of Embodiment 3 of the present disclosure.

Figure 13:
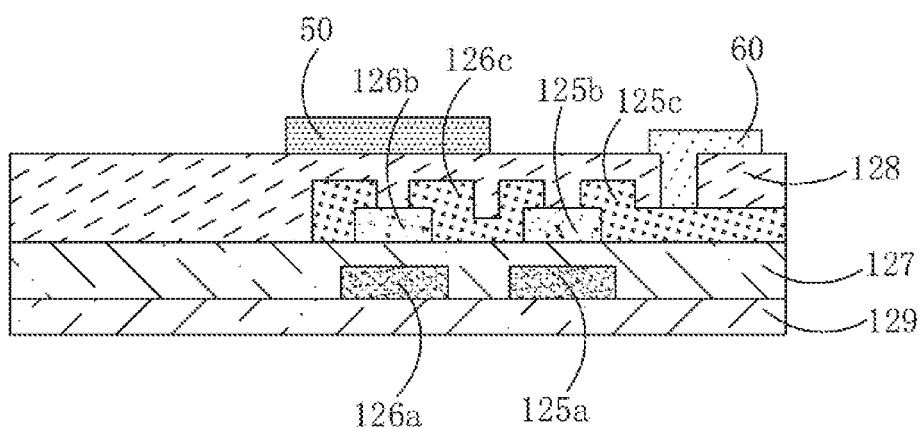
FIGS. 13, 14, 15 and 16 are schematic diagrams of the manufacturing process of the display panel of embodiment 3 of the present disclosure.

As shown in FIG. 13, a first metal layer is formed on the base substrate 129, and the first metal layer is patterned to form a first gate electrode 125a and a second gate electrode 126a spaced apart; a gate insulating layer 127 covering the first gate electrode 125a and the second gate electrode 126a is formed; a semiconductor layer is formed on the gate insulating layer 127, and the semiconductor layer is patterned to form the first semiconductor layer 125b and the second semiconductor layer 126b spaced apart; a second metal layer is formed on the gate insulating layer 127, the first semiconductor layer 125b, and the second semiconductor layer 126b, and is patterned to form a first source-drain electrode 125c and a second source-drain electrode 126c; a first passivation layer 128 covering the first semiconductor layer 125b, the first source-drain electrode 125c, the second semiconductor layer 126b, and the second source-drain electrode 126c is formed; a light-shielding layer 50 is formed on a region corresponding to the second semiconductor layer 126b on the first passivation layer 128; and after a via hole extending to the surface of the second source-drain electrode 126c is formed on the first passivation layer 128, a conductive metal layer 60 covering the via hole is formed on the first passivation layer 128.

Figure 14:
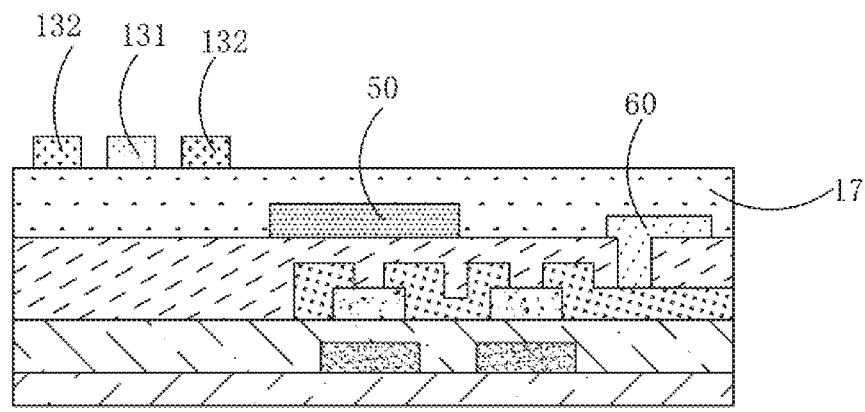

As shown in FIG. 14, a planarization layer 17 covering the light-shielding layer 50 and the conductive metal layer 60 is formed, and the transmitting electrode 131 and the receiving electrode 132 are formed and spaced apart from each other on the planarization layer 17.

Figure 15:
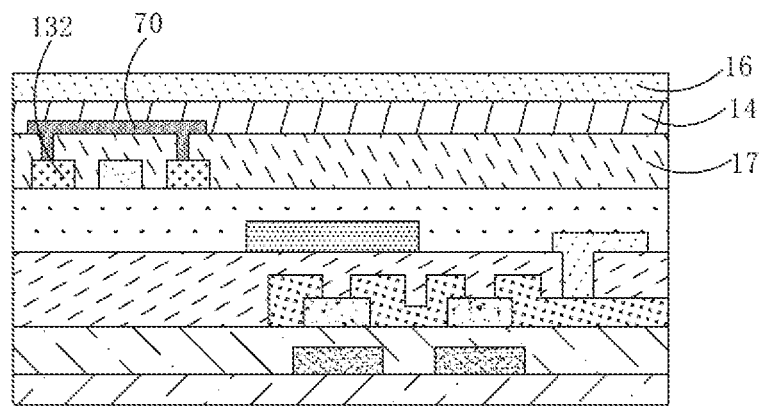

As shown in FIG. 15, a second passivation layer 18 covering the transmitting electrode 131 and the receiving electrode 132 is formed; a connection hole connecting to the surface of the receiving electrode 132 is formed on the second passivation layer 18; a connecting line 70 connecting two adjacent receiving electrodes 132 is filled on the second passivation layer 18; and after forming the first optical adhesive layer 14 covering the connecting line 70, the encapsulation cover is attached to the first optical adhesive layer 14 to form an external functional layer with integrated touch function and light control function.

Figure 16:
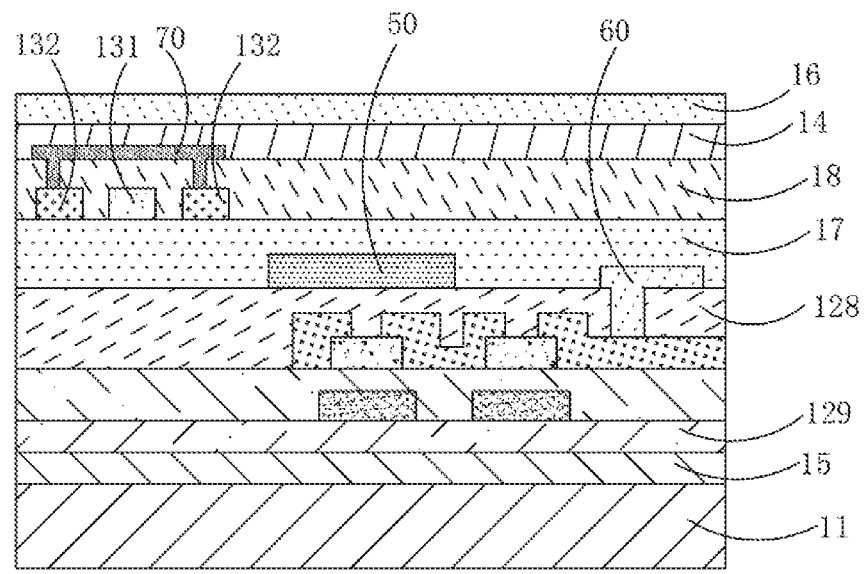

As shown in FIG. 16, a second optical adhesive layer 15 is formed on the surface of the display screen body 11, and the external functional layer is attached and fixed on the display screen body 11 through the second optical adhesive layer 15.

Embodiment 4

Figure 17:
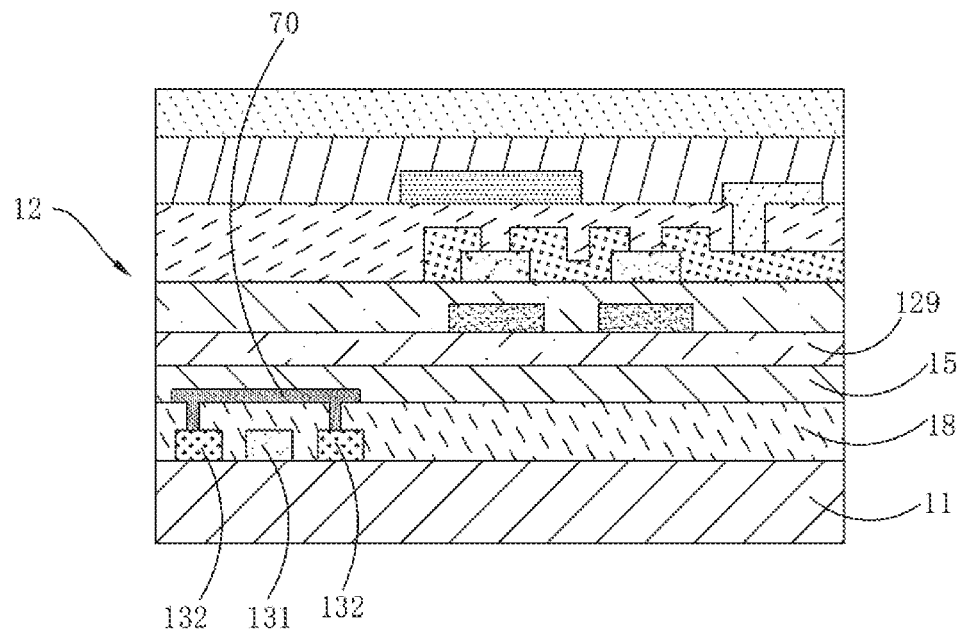
FIG. 17 is a schematic structural diagram of a display panel of embodiment 4 of the present disclosure.

A display device, as shown in FIG. 17, is different from the second embodiment in that the transmitting electrode 131 and the receiving electrode 132 are disposed in the same layer, and the transmitting electrode 131 and the receiving electrode 132 are disposed on the surface of the display screen body 11. A second passivation layer 18 covering the transmitting electrode 131 and the receiving electrode 132 is disposed on the surface of the display screen body 11, and the light control layer 12 is disposed on a side away from the display screen body 11 of the second passivation layer 18.

It should be noted that by directly integrating the touch device 13 on the display screen body 11 in an outlay embedding manner, the light control layer 12 is disposed on a side of the second passivation layer 18 away from the display screen body 11, and therefore can prevent the display panel 10 from defecting caused by the arrangement of the touch device 13 and the light control device interfering with each other, while also improving touch sensitivity of the display panel 10.

In one embodiment, the light control layer 12 is attached to the second passivation layer 18 through the second optical adhesive layer 15, and the second optical adhesive layer 15 is disposed on the second passivation layer 18 and covers the connecting line 70.

Specifically, a plurality of the receiving electrodes 132 may be spaced apart from each other, wherein each two adjacent receiving electrodes 132 are electrically connected by a connecting line 70 on the second passivation layer 18 to form a mesh structure.

It should be noted that all of the receiving electrodes 132 are electrically connected by the connecting line 70 to form the mesh structure, so as to achieve the purpose that any position on the display panel 10 will have a touch function, and the connecting line 70 and the receiving electrodes 132 are disposed in different film layers, so as to prevent short circuiting between the connecting line 70 and the transmitting electrode 131.

In one embodiment, the first optical adhesive layer 14 is disposed on the first passivation layer 128 and covers the light-shielding layer 50 and the conductive metal layer 60.

It should be noted that FIG. 17 only illustrates the case where the light control layer 12 is disposed above the touch device 13. In actual implementation, the first gate electrode 125a and the second gate electrode 126a may also be disposed on the base substrate 129.

As shown in FIG. 18 to FIG. 21, FIG. 18 to FIG. 21 are schematic diagrams of a manufacturing process of the display panel 10 in the Embodiment 4.

Figure 18:
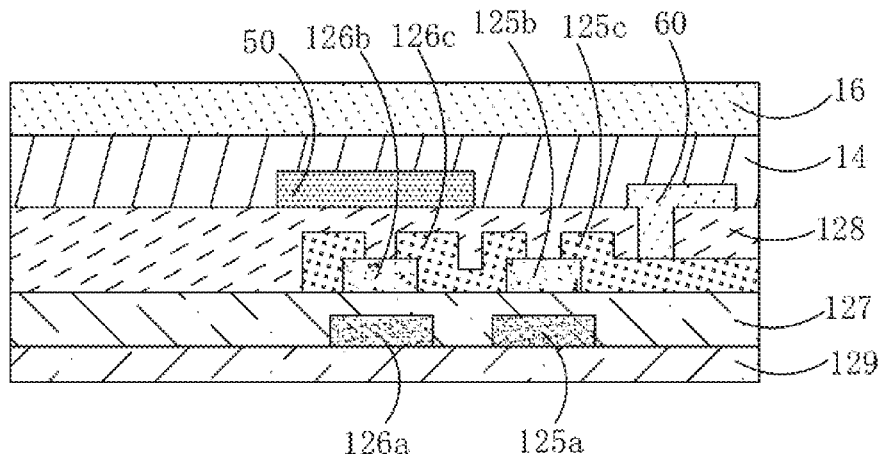
FIGS. 18, 19, 20 and 21 are schematic diagrams of the manufacturing process of the display panel of embodiment 4 of the present disclosure.

As shown in FIG. 18, a first gate electrode 125a and a second gate electrode 126a are formed and spaced apart on the base substrate 129; a gate insulating layer 127 covering the first gate 125a and the second gate 126a is formed; the first semiconductor layer 125b and the second semiconductor layer 126b are formed and spaced apart on the gate insulating layer 127; a first source-drain electrode 125c and a second source-drain electrode 126c are formed on the gate insulating layer 127, the first semiconductor layer 125b, and the second semiconductor layer 126b; a first passivation layer 128 covering the first semiconductor layer 125b, the first source-drain electrode 125c, the second semiconductor layer 126b, and the second source-drain electrode 126c is formed; a light-shielding layer 50 is formed on a region corresponding to the second semiconductor layer 126b on the first passivation layer 128; after forming a via hole extending to the surface of the second source-drain electrode 126c on the first passivation layer 128, a conductive metal layer 60 covering the via hole is formed on the first passivation layer 128; and after forming the first optical adhesive layer 14 covering the light shielding layer 50 and the conductive metal layer 60, the encapsulation cover is attached to the first optical adhesive layer 14 to form the light control layer 12.

Figure 19:
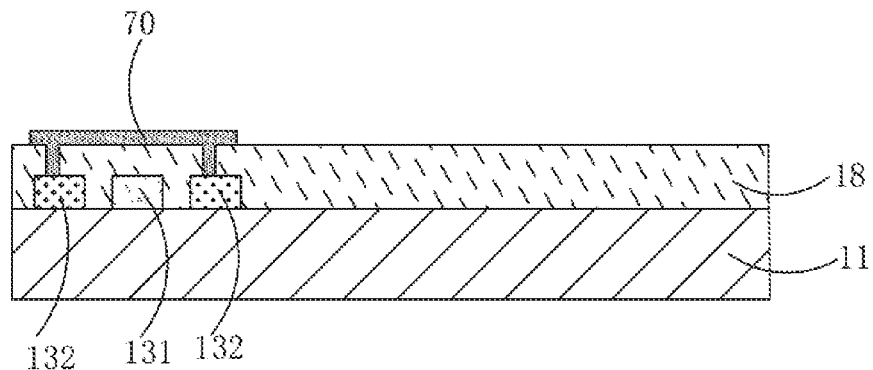

As shown in FIG. 19, the transmitting electrode 131 and the receiving electrode 132 are formed on the display screen body 11 and spaced apart; a second passivation layer 18 covering the transmitting electrode 131 and the receiving electrode 132 is formed; a connection hole that extends to the surface of the receiving electrode 132 is formed on the second passivation layer 18; and a connecting line 70 connecting two adjacent receiving electrodes 132 is filled on the second passivation layer 18.

Figure 20:
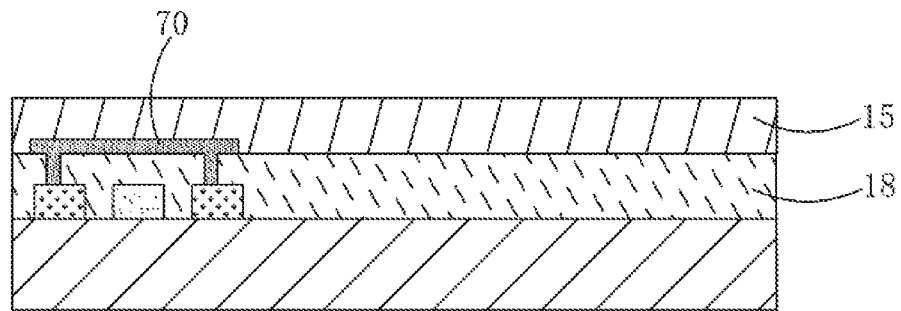

As shown in FIG. 20, a second optical adhesive layer 15 covering the connecting line 70 is formed.

Figure 21:
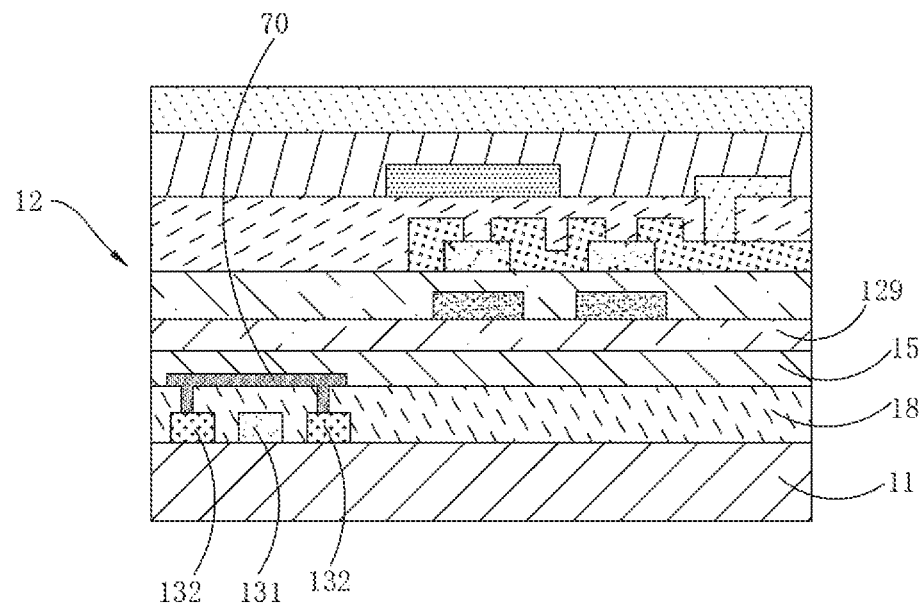

As shown in FIG. 21, the light control layer 12 is bonded and fixed to the second optical adhesive layer 15 to fix the light control layer 12 and the touch device 13 on the display screen body 11.

Embodiment 5

Figure 22:
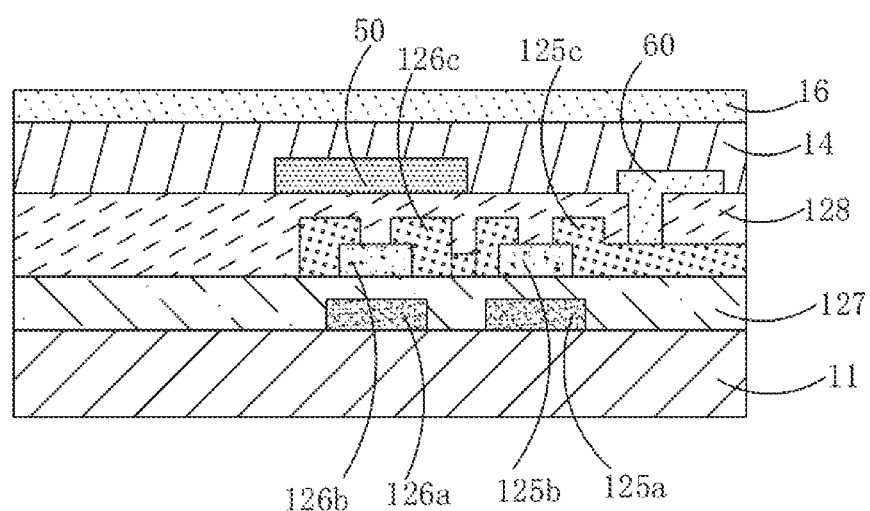
FIG. 22 is a schematic structural diagram of a display panel of embodiment 5 of the present disclosure.

A display device, as shown in FIG. 22, is different from embodiment 2 in that the photosensitive devices 125 are multipurpose as the touch device 13.

It should be noted that when the display panel 10 needs to be operated remotely, when the first beam emitted by the beam emitter 20 is projected onto the display panel 10, the photosensitive devices 125 output a sensing signal to the reading module 122 according to the sensing result. After the reading module 122 determines the projection position of the first beam on the display panel 10 according to the sensing signal, the reading module 122, in cooperation with the operation of the beam emitter 20, performs a corresponding operation to the projection position of the first beam to achieve light control function. The finger touches the display panel 10 when the display panel 10 needs to be operated by touch at close range. Then, the light intensity received by the photosensitive devices 125 at the touch position on the display panel 10 changes, and the photosensitive devices 125 send a touch signal to the display panel, and the driving module determines the touch position according to the touch signal and performs corresponding operations on the touch position.

It should be noted that by multipurpose the photosensitive devices 125 as the touch device 13, on the premise of ensuring that the display panel 10 has both the light control function and the touch function, there is no need to add a film layer and a device, thereby reducing production costs and an overall thickness of the display panel 10.

Specifically, a photosensitivity of the photosensitive devices 125 is greater than a second preset value.

It should be noted that the second preset value is greater than the first presetting value. The greater the photosensitivity of the photosensitive devices 125, the more sensitive it is to the induction of light, and the photosensitivity of the photosensitive devices 125 can be enhanced by designing the photosensitivity of the photosensitive devices 125. Therefore, the light intensity change when the finger touches the display panel 10 causes the sensing of the photosensitive devices 125, and at the same time, can also reduce the intensity requirement of the beam emitted by the beam emitter 20. The second preset value can be selected according to the actual situation, to ensure that the light intensity change causes the sensing of the photosensitive devices 125 when the finger touches the display panel 10.

It should be noted that when the ambient light and indoor lights are too weak, the change in the light intensity of the reflected light can be detected in the form of supplementary backlight to complete the touch control function.

The beneficial effects of the present disclosure are: by simultaneously integrating the light control function and the touch function in the display panel 10, the display panel 10 has both the light control function and the touch function. At the same time, the display panel can be used with the beam emitter 20 when it needs to be operated remotely, so that the presenter can operate the display panel 10 by holding and using the beam emitter 20. Meanwhile, an input position fast conversion is realized by moving the beam emitter 20, which is convenient and fast for remote operation of the display panel.

In summary, although the present disclosure has been disclosed as preferred embodiments above, the above preferred embodiments are not intended to limit the present disclosure. Those of ordinary skill in the art can make various changes and retouching without departing from the spirit and scope of the present disclosure. Therefore, the protection scope of the present disclosure is subject to the scope defined by the claims.

What is claimed is:

1. A display device, wherein the display device comprises a beam emitter and a display panel;
    the beam emitter is configured to emit a first beam to mark an input position on the display panel, and perform an operation to the input position which is marked by the first beam;
    the display panel comprises a display screen body and a light control layer disposed on a light-emitting side of the display screen body, the light control layer comprises photosensitive devices configured to sense the first beam projected on the display panel, and the photosensitive devices are configured to output a sensing signal according to a sensing result;
    wherein the display panel further comprises a touch device disposed on the light-emitting side of the display screen body, the touch device comprises a transmitting electrode and a receiving electrode spaced apart from each other, a touch capacitance is formed between the transmitting electrode and the receiving electrode, and a photosensitivity of the photosensitive device is less than a first presetting value, wherein the transmitting electrode is disposed in a same layer as the first gate electrode, and the receiving electrode is disposed in a same layer as the first source-drain electrode;
    wherein the light control layer further comprises a control module and a reading module, the control module is electrically connected to the photosensitive device to output a control signal for controls turning on and turning off of the photosensitive devices, the reading module is electrically connected to the photosensitive devices to read the sensing signal output by the photosensitive device, the reading module is configured to determine a projection position of the first beam on the display panel according to the sensing signal, and the reading module is further configured to perform a corresponding operation to the projection position of the first beam;
    wherein the light control layer comprises:
    a first gate electrode;
    a gate insulating layer covering the first gate electrode;
    a first semiconductor layer disposed on the gate insulating layer;
    a first source-drain electrodes electrically connected to the first semiconductor layer; and
    a first passivation layer covering the first source-drain electrodes and the first semiconductor layer;
    wherein the photosensitive devices comprise the first gate electrode, the first semiconductor layer, and the first source-drain electrodes, and the reading module is electrically connected to the first source-drain electrodes.

2. The display device as claimed in claim 1, wherein the first gate electrode is disposed on a surface of the display screen body.

3. The display device as claimed in claim 1, wherein the light control layer further comprises a base substrate disposed on the display screen body, and the first gate electrode is disposed on a side of the base substrate away from the display screen body.

4. The display device as claimed in claim 1, wherein the light control layer further comprises switching devices electrically connected to the photosensitive devices, one of the switching devices comprises:
   a second gate electrode, wherein the second gate electrode and the first gate electrode are arranged in a same layer and spaced apart, and the control module is electrically connected to the second gate electrode;
   a second semiconductor layer, wherein the second semiconductor layer and the first semiconductor layer are disposed in a same layer and spaced apart; and
   a second source-drain electrodes, wherein the second source-drain electrodes is disposed in a same layer as the first source-drain electrodes and electrically connected to the second semiconductor layer, wherein the second source-drain electrodes are electrically connected to the first source-drain electrodes.

5. The display device as claimed in claim 4, wherein a light-shielding layer is further disposed on the first passivation layer, and an orthographic projection of the light-shielding layer on the gate insulating layer covers an orthographic projection of the second semiconductor layer on the gate insulating layer.

6. The display device as claimed in claim 1, wherein the transmitting electrode and the receiving electrode are disposed in a same layer.

7. The display device as claimed in claim 6, wherein a side of the first passivation layer away from the display screen body is provided with a planarization layer, and the transmitting electrode and the receiving electrode are disposed on the planarization layer, and a second passivation layer covering the transmitting electrode and the receiving electrode is also disposed on the planarization layer.

8. The display device as claimed in claim 6, wherein the transmitting electrode and the receiving electrode are disposed on a surface of the display screen body, the surface of the display screen body is provided with a second passivation layer covering the transmitting electrode and the receiving electrode, and the light control layer is disposed on a side of the second passivation layer away from the display screen body.

9. The display device as claimed in claim 6, wherein the transmitting electrode and the receiving electrode are disposed in a same layer as the first gate electrode, or the transmitting electrode and the receiving electrode are arranged in a same layer as the first source-drain electrode.

10. The display device as claimed in claim 1, wherein the photosensitive devices are as multipurpose as a touch device, and a photosensitivity of the photosensitive devices are greater than a second presetting value.

11. The display device as claimed in claim 1, wherein the beam emitter comprises:
    a main body;
    a light-emitting component disposed on the main body and configured to emit the first beam;
    a projection button and an operation button both disposed on the main body; and
    a control component disposed on the main body, wherein the control component is connected with the projection button, the operation button, and the light-emitting component, configured to control the light-emitting component to emit the first beam when the projection button is pressed and configured to control the reading module to perform the corresponding operation to the projection position of the first beam when the operation button is pressed.

12. The display device as claimed in claim 11, wherein the beam emitter further emits a second beam to confirm the input position, and the beam emitter emits the second beam when the operation button is pressed, the photosensitive devices output a first sensing signal to the reading module when sensing the first beam, the photosensitive devices output a second sensing signal to the reading module when sensing the second beam, and the reading module compares the first sensing signal and the second sensing signal and performs a corresponding operation to the projection position of the second beam according to a comparison result, or the reading module performs the corresponding operation to a projection position of first beam according to the second sensing signal.

13. The display device as claimed in claim 12, wherein a first light spot projected on the display panel by the first beam and a second light spot projected on the display panel by the second beam are located at any position on a surface of the display panel, and the first light spot and the second light spot both cover at least one orthographic projection of the photosensitive device on the surface of the display panel.

14. The display device as claimed in claim 12, wherein the beam emitter is communicatively connected with the display panel, the beam emitter sends the control signal to the reading module when the operation button is pressed, and the reading module performs the corresponding operation to the projection position of the first beam according to the control signal.

15. The display device as claimed in claim 12, wherein the first beam is different from the second beam.

16. The display device as claimed in claim 15, wherein the first beam is different from the second beam in one or more of intensity, wavelength, beam cross-sectional size, and frequency.

17. The display device as claimed in claim 1, wherein all of the photosensitive devices are distributed in an array, the light control layer further comprises a plurality of first signal lines arranged along a lateral direction and a plurality of second signal lines arranged along a longitudinal direction, the plurality of first signal lines are distributed at intervals in the longitudinal direction, the plurality of second signal lines are distributed at intervals in the lateral direction, each one of the plurality of first signal lines corresponds to and electrically connects to one row of the photosensitive devices, each one of the plurality of second signal lines corresponds to and electrically connects to one column of the photosensitive devices, all of the first signal lines are electrically connected to the control module to transmit the control signal to the photosensitive devices, and all of the second signal lines are electrically connected to the reading module to read the sensing signal output by the photosensitive devices.

18. A display device, wherein the display device comprises a beam emitter and a display panel;
    the beam emitter is configured to emit a first beam to mark an input position on the display panel, and perform an operation to the input position which is marked by the first beam;
    the display panel comprises a display screen body and a light control layer disposed on a light-emitting side of the display screen body, the light control layer comprises photosensitive devices configured to sense the first beam projected on the display panel, and the photosensitive devices are configured to output a sensing signal according to a sensing result;

wherein the display panel further comprises a touch device disposed on the light-emitting side of the display screen body, the touch device comprises a transmitting electrode and a receiving electrode spaced apart from each other, a touch capacitance is formed between the transmitting electrode and the receiving electrode, and a photosensitivity of the photosensitive device is less than a first presetting value, wherein the transmitting electrode is disposed in a same layer as the first gate electrode, and the receiving electrode is disposed in a same layer as the first source-drain electrode;

wherein the light control layer further comprises a control module and a reading module, the control module is electrically connected to the photosensitive device to output a control signal for controls turning on and turning off of the photosensitive devices, the reading module is electrically connected to the photosensitive devices to read the sensing signal output by the photosensitive device, the reading module is configured to determine a projection position of the first beam on the display panel according to the sensing signal, and the reading module is further configured to perform a corresponding operation to the projection position of the first beam.

* * * * *